United States Patent
Allen et al.

(10) Patent No.: US 8,941,652 B1
(45) Date of Patent: Jan. 27, 2015

(54) INCREMENTAL SURFACE HOLE FILLING

(75) Inventors: Brett Allen, San Francisco, CA (US); Joshua Sam Schpok, Milpitas, CA (US)

(73) Assignee: Google Inc., Mountain View, CA (US)

( * ) Notice: Subject to any disclaimer, the term of this patent is extended or adjusted under 35 U.S.C. 154(b) by 437 days.

(21) Appl. No.: 13/478,822

(22) Filed: May 23, 2012

(51) Int. Cl.
  *G06T 17/20* (2006.01)
(52) U.S. Cl.
  USPC ............................................ 345/420
(58) Field of Classification Search
  CPC ......... G06T 17/20; G06T 19/00; G06T 17/00; G06T 2210/04; G06T 2219/2004; G06T 2219/2021; G06T 5/40; G06T 9/20; H04N 1/0451; G03F 3/011; G09G 3/3611
  See application file for complete search history.

(56) References Cited

U.S. PATENT DOCUMENTS

| | | | |
|---|---|---|---|
| 6,912,293 B1 | 6/2005 | Korobkin | |
| 6,970,593 B2 | 11/2005 | Furukawa | |
| 7,193,633 B1 | 3/2007 | Reinhardt et al. | |
| 2004/0165787 A1* | 8/2004 | Perez et al. | 382/284 |
| 2005/0128212 A1 | 6/2005 | Edecker et al. | |
| 2005/0212794 A1 | 9/2005 | Furukawa et al. | |
| 2008/0218509 A1* | 9/2008 | Voth | 345/419 |
| 2009/0141020 A1 | 6/2009 | Freund et al. | |
| 2009/0244062 A1 | 10/2009 | Steedly et al. | |
| 2011/0096083 A1 | 4/2011 | Schultz | |
| 2011/0187716 A1 | 8/2011 | Chen et al. | |

OTHER PUBLICATIONS

Wang, Jianning, and Manuel M. Oliveira., "A hole-filling strategy for reconstruction of smooth surfaces in range images." Computer Graphics and Image Processing, 2003. SIBGRAPI 2003. XVI Brazilian Symposium on. IEEE, 2003.*
Kondrashov, Dmitri, and Michael Ghil., "Spatio-temporal filling of missing points in geophysical data sets." Nonlinear Processes in Geophysics 13.2 (2006): 151-159.*
Firestone, Eric, "An Exploration of Hole Filling Algorithms: A Thesis Presented to the Faculty of California Polytechnic State University San Luis Obispo," Jun. 2008.

* cited by examiner

*Primary Examiner* — Ke Xiao
*Assistant Examiner* — Sarah Le
(74) *Attorney, Agent, or Firm* — Dority & Manning, P.A.

(57) ABSTRACT

Systems, methods, and computer storage mediums are provided for filling missing data in a spatially distributed, graphically represented data set. An example method includes dividing the data set into a first plurality of tiles along a first plurality of boundary lines. For each of the first plurality of tiles, a first set of fill data is generated to fill missing data in the data set. Then, for each of a determined number of dimensions of the tiles, the data set is divided into a new plurality of tiles along a new plurality of boundary lines offset from the last immediately determined plurality of boundary lines and a new set of fill data is generated to fill the missing data. A portion of the new set of fill data includes a portion of the last immediately generated set of fill data that fall along the boundary of the respective new tile.

20 Claims, 11 Drawing Sheets
(4 of 11 Drawing Sheet(s) Filed in Color)

INCREMENTAL SURFACE HOLE FILLING

FIELD

The embodiments described herein generally relate to generating and rendering missing data in spatially distributed data sets.

BACKGROUND

Geographic information systems allow users to download, view, and interact with geo-referenced data that includes two-dimensional and three-dimensional, graphical data that describes the Earth. The graphical data may be provided to a user via a network and rendered and displayed at the user's computer system. The graphical data may include maps, 3D environments or other graphical representations. The graphical data may be created using data collected from, for example, real-world environments. The collected data may be incomplete which may result in holes or missing data that appear when the data is rendered and displayed. To fill-in the missing data, conventional systems may break the data into multiple pieces and fill the portions missing in each piece. Using multiple systems will result in a discontinuity between the filled data that fall along the borders of each of the pieces. Alternatively, conventional systems may fill-in the missing data using a single computer process. While a single computer process may result in no discontinuities, the single computer process will require a much longer time to complete.

BRIEF SUMMARY

The embodiments described herein include systems, methods, and computer storage mediums for filling missing data in a spatially distributed, graphically represented data set. An example method includes determining tiling dimensions of the data set that describe the number of dimensions to use in processing the data set. The tiling dimensions may be based, at least in part, on the number of dimensions represented in the data set. The data set is divided into a first plurality of tiles along a first plurality of boundary lines. Each tile includes a different spatial region of the data set and the number of tiles, the size of the tiles, and the dimensions of the tiles may each be based on the tiling dimensions. For each of the first plurality of tiles, a first set of fill data is generated to fill at least a portion of the missing data in the spatial region of the data set included in each of the respective first plurality of tiles.

Then, for each of the number of dimensions indicated by the tiling dimensions, the data set is divided into a new plurality of tiles along a new plurality of boundary lines offset from the last immediately determined plurality of boundary lines. Each tile created by the new plurality of boundary lines includes a different spatial region of the data set. For each of the new plurality of tiles, a new set of fill data is generated to fill at least a portion of the missing data in the spatial region of the data set included in the respective tile. A portion of the missing data included in the respective tile may be filled-in with a portion of the last immediately generated set of fill data that falls along the new plurality of boundary lines that surrounds the respective tile. Once a final set of fill data is generated, the fill data is added to the data set to fill in at least some missing portions of the data set.

Further features and advantages of the embodiments described herein, as well as the structure and operation of various embodiments, are described in detail below with reference to the accompanying drawings.

BRIEF DESCRIPTION OF THE DRAWINGS/FIGURES

The patent or application file contains at least one drawing executed in color. Copies of this patent or patent application publication with color drawing(s) will be provided by the Office upon request and payment of the necessary fee. Embodiments are described with reference to the accompanying drawings. In the drawings, like reference numbers may indicate identical or functionally similar elements. The drawing in which an element first appears is generally indicated by the left-most digit in the corresponding reference number.

FIGS. 1A-G illustrate diagrams showing an example process for filling-in missing data in a spatially distributed height field data set, according to an embodiment.

FIGS. 2A-G illustrate diagrams showing an example process for filling-in missing data in a spatially distributed color field data set, according to an embodiment.

DETAILED DESCRIPTION

The embodiments described herein may be used to fill-in missing data in a spatially distributed, graphically represented data set. The missing data may be caused by any number of situations including, for example, incomplete data collection or analysis or data loss. Using the embodiments described herein, the missing data in a data set may be filled to form a continuous data set free of any missing data or discontinuities.

The following Detailed Description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following detailed description refers to the accompanying drawings that illustrate example embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

This Detailed Description is divided into sections. The first section describes some examples of a process for filling-in missing in a graphically represented data set. The second and third sections describe example system and method embodiments, respectively, for filling-in missing data in a data set. The fourth section describes an example computer system that may be used to implement the embodiments described herein.

Example Data Filling in Spatially Distributed Data Sets

Figure 1A:
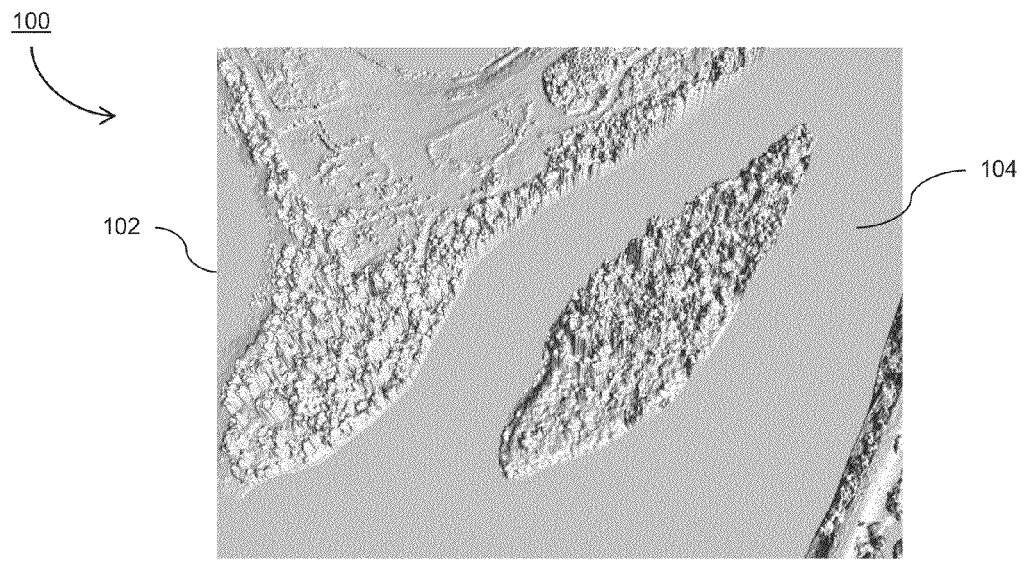

FIGS. 1A-G illustrate diagrams showing an example process for filling-in missing data in a spatially distributed data set, according to an embodiment. FIG. 1A illustrates a diagram 100 that includes height field 102 that describes the terrain of a three-dimensional environment that may be provided by a geographic information server. Height field 102 describes elevations of points in the spatially distributed data. Height field 102 may be created using data that describes, for example, real-world terrain. The data, however, may lack descriptions of the terrain (e.g., data values) at certain data points. This lack of data may appear as one or more holes when height field 102 is rendered. In diagram 100, hole 104 represents the missing data values in the data set.

In some embodiments, height field 102 may represent a geospatial model generated from a plurality of aerial photos using stereo reconstruction. Stereo reconstruction may involve identifying features appearing in photos taken from cameras from different perspectives. The perspective information may be used to triangulate the three-dimensional locations of the respective features. In this way, a three-dimensional model, such as a height field 102, may be determined based on features appearing in various aerial photographs.

However, aerial photographs may cover geographic areas that appear generally uniform and have few distinctive features. For example, bodies of water (such as lakes, rivers, oceans, etc.) may appear uniform across the images and may have few (if any) distinctive features. Without sufficient features, a stereo reconstruction of the aerial photographs may not yield reliable three-dimensional data describing those uniform geographic areas. For this reason, the resulting height fields may have missing data graphically represented as holes, such as hole 104 in diagram 100. Embodiments relate to filling this missing data.

In other embodiments, the height field 102 may be generated using radar or laser data, and missing data may occur in areas where the light or signals are absorbed and not reflected back to the appropriate sensor.

Figure 1B:
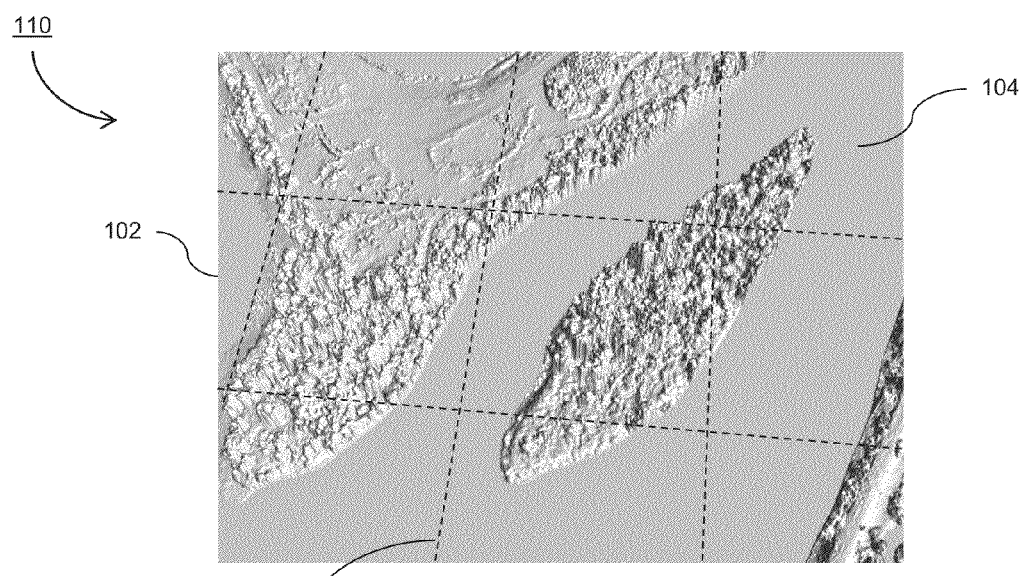

FIG. 1B illustrates a diagram 110 that includes height field 102 divided by a plurality of boundary lines 114. Boundary lines 114 are used to break height field 102 into a plurality of tiles. The position of boundary lines 114 may be determined such that the resulting tiles are processed in a desired amount of time by one or more processing servers.

Figure 1C:
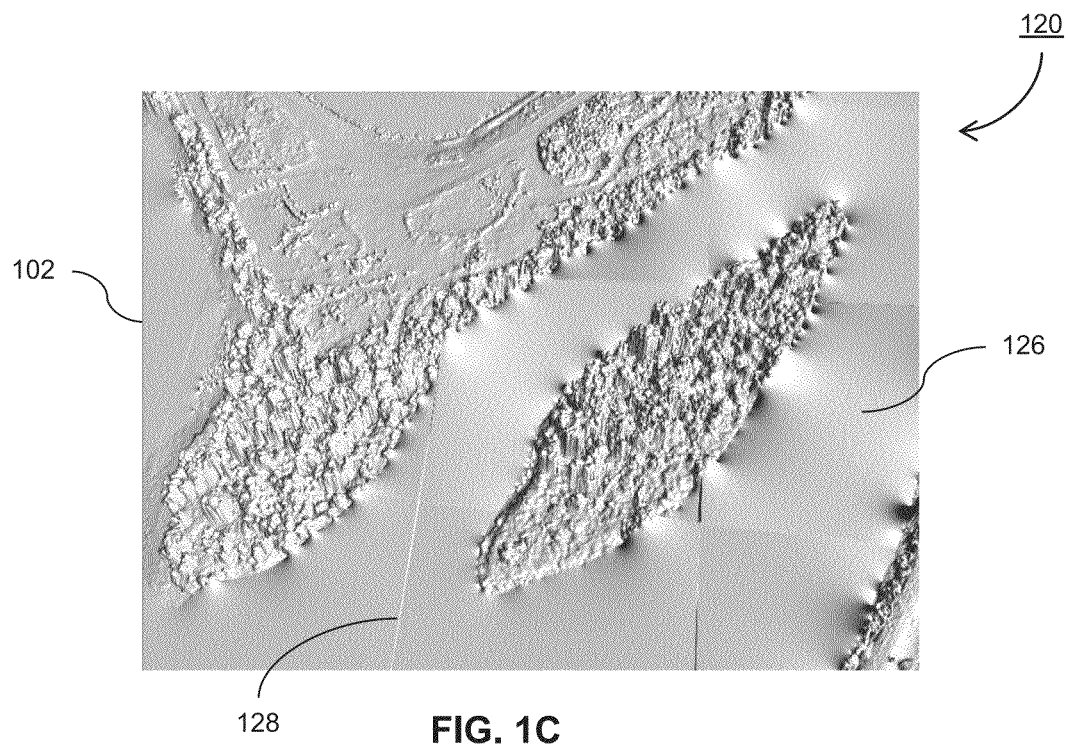

FIG. 1C illustrates a diagram 120 that includes the plurality of tiles filled with fill data 126. Once height field 102 is divided into tiles by boundary lines 114, fill data 126 is generated to fill hole 104. Here, fill data 126 is represented in a tile as a smooth, continuous potion of height field 102. Fill data 126 may be added to the data set or may be stored in a separate data structure. As a result of generating fill data 126 for hole 104, a discontinuity 128 may exist between the tiles along boundary lines 114. The discontinuity 128 appears in height field 102 as a break between the tiles along boundary lines 114.

Figure 1D:
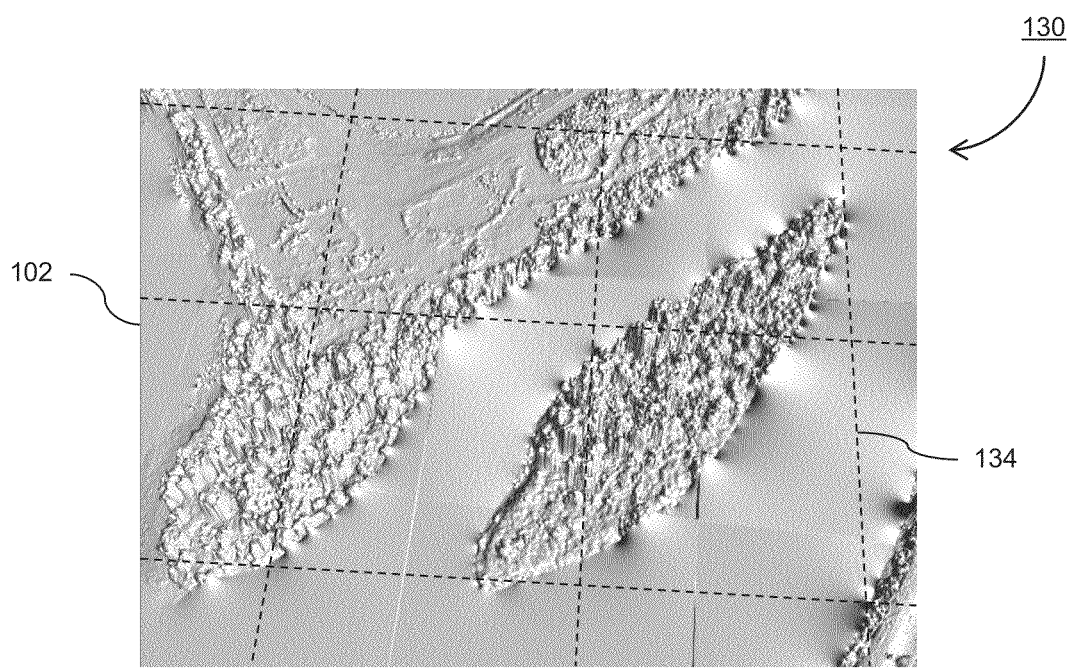

FIG. 1D illustrates a diagram 130 that includes height field 102 divided by a plurality of boundary lines 134 that are offset from boundary lines 114. Boundary lines 134 are used to break height field 102 into a plurality of tiles that differ from the plurality of tiles created by boundary lines 114. The position of boundary lines 134 may be determined by, for example, moving boundary lines 114 to a desired distance away from their original position.

Figure 1E:
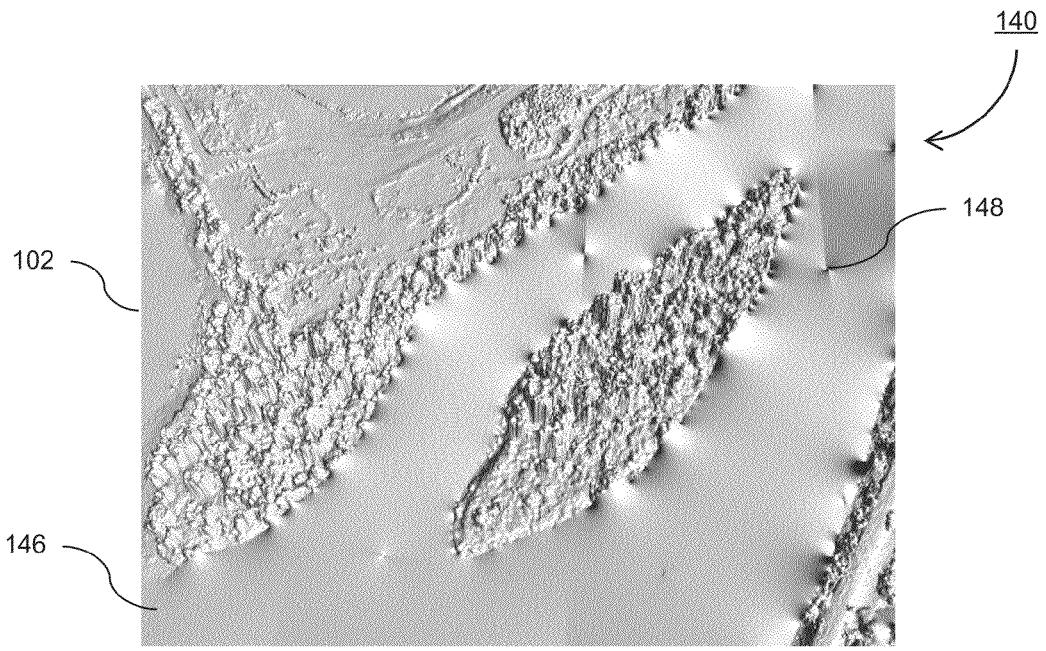

FIG. 1E illustrates a diagram 140 that includes a plurality of tiles where the holes are filled with fill data 146. Once height field 102 is divided into tiles by boundary lines 134, fill data 146 is generated to again fill hole 104. Fill data 146 includes the portion of fill data 126 that fall along boundary lines 134 in addition to new fill data that is generated based on the data values in the data set that surround hole 104. The portion of fill data 126 that is included in fill data 146 prevents a discontinuity in the fill data between boundary lines 134 as a result of generating fill data 146 separately for each tile. Fill data 146 may be added to the data set or may be stored in a separate data structure. As a result of generating fill data 146 for hole 104, a discontinuity 148 may exist between the tiles along boundary lines 134, especially where boundary lines 114 intersect boundary lines 134. The discontinuity 148 may appear in height field 102 as, for example, a point. The point represents a higher or lower altitude compared to the surrounding data values in the height field.

Figure 1F:
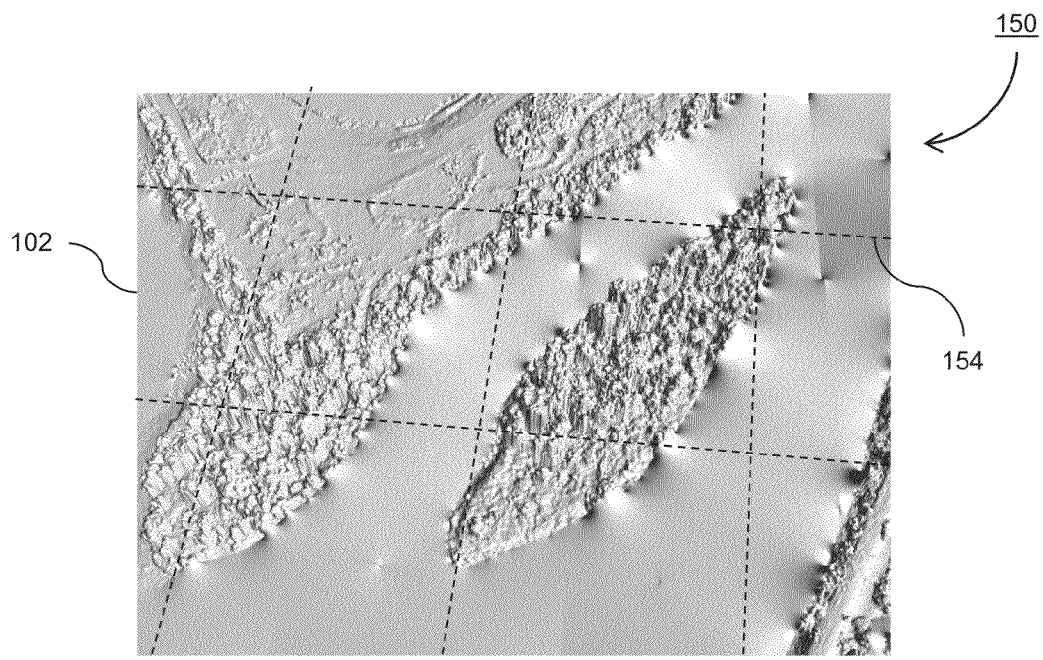

FIG. 1F illustrates a diagram 150 that includes height field 102 divided by a plurality of boundary lines 154 that are offset from both boundary lines 114 and 134. Boundary lines 154 are used to break height field 102 into a plurality of tiles that differ from the plurality of tiles created by both boundary lines 114 and 134. The position of boundary lines 154 may be determined by, for example, moving boundary lines 134 to a desired distance away from their original position.

Figure 1G:
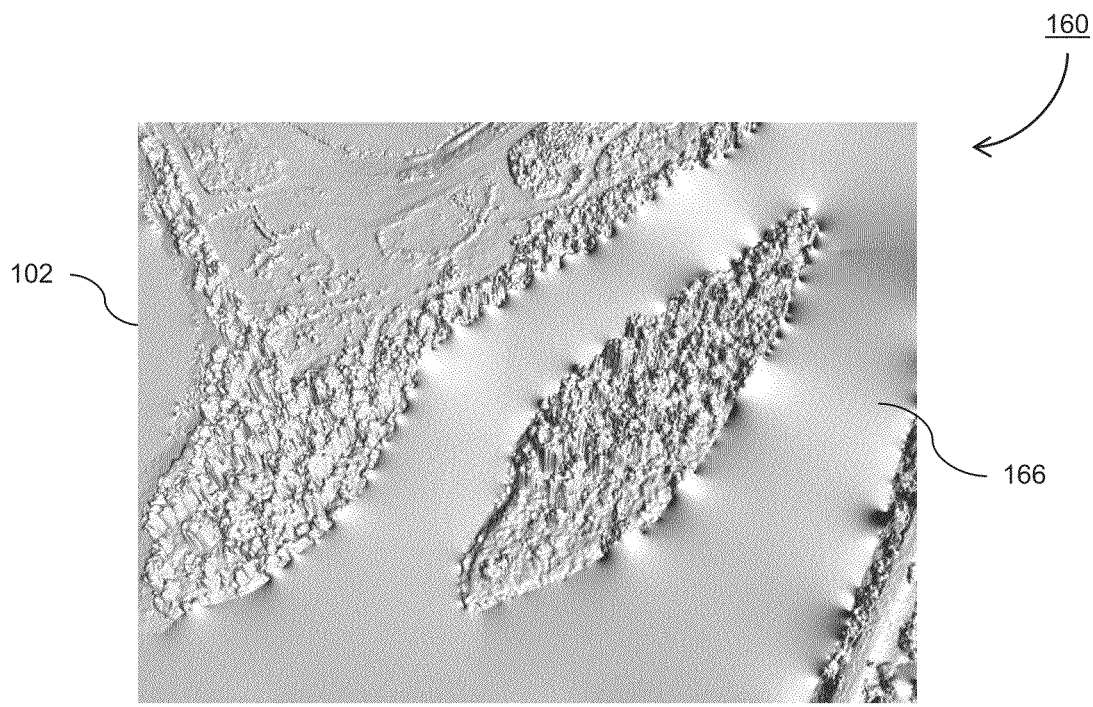

FIG. 1G illustrates a diagram 160 that includes a plurality of tiles where the holes are filled with fill data 166. Once height field 102 is divided into tiles by boundary lines 154, fill data 166 is generated to fill hole 104. Fill data 166 includes the portion of fill data 146 that fall along boundary lines 154 in addition to new data generated based on the data values in the data set that surround hole 104. The portion of fill data 146 that is included in fill data 166 prevents a discontinuity in fill data 166 between boundary lines 154 as a result of generating fill data 166 separately for each tile. Fill data 166 may be added to the data set or may be stored in a separate data structure. As a result of generating fill data 166 for hole 104, any discontinuity in the fill data will be either minimized or completely eliminated.

Figure 2A:
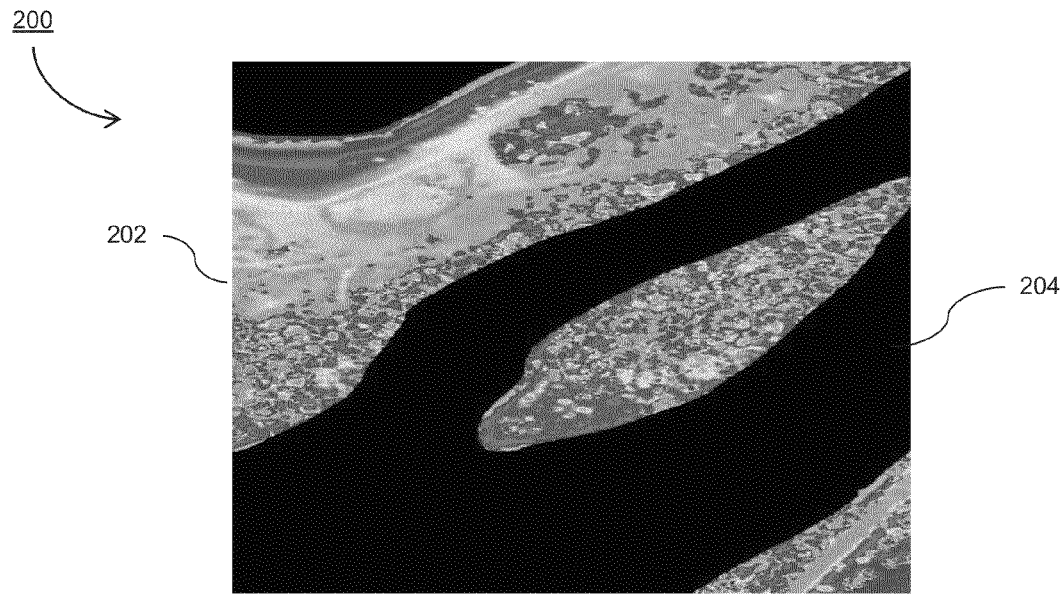

FIGS. 2A-G illustrate diagrams showing an example process for filling-in missing data in a spatially distributed data set, according to an embodiment. FIG. 2A illustrates a diagram 200 that includes color field 202 that shows the terrain of a three-dimensional environment where various altitudes appear in different colors. Color field 202, however, may also include other types of graphically represented data. Like height field 102, color field 202 may be created using data that describes, for example, real-world terrain. The data, however, may lack descriptions of the terrain (e.g., data values) at certain data points. This lack of data may appear as one or more designated colors when color field 204 is rendered. In diagram 200, hole 204 is represented by the color black.

Figure 2B:
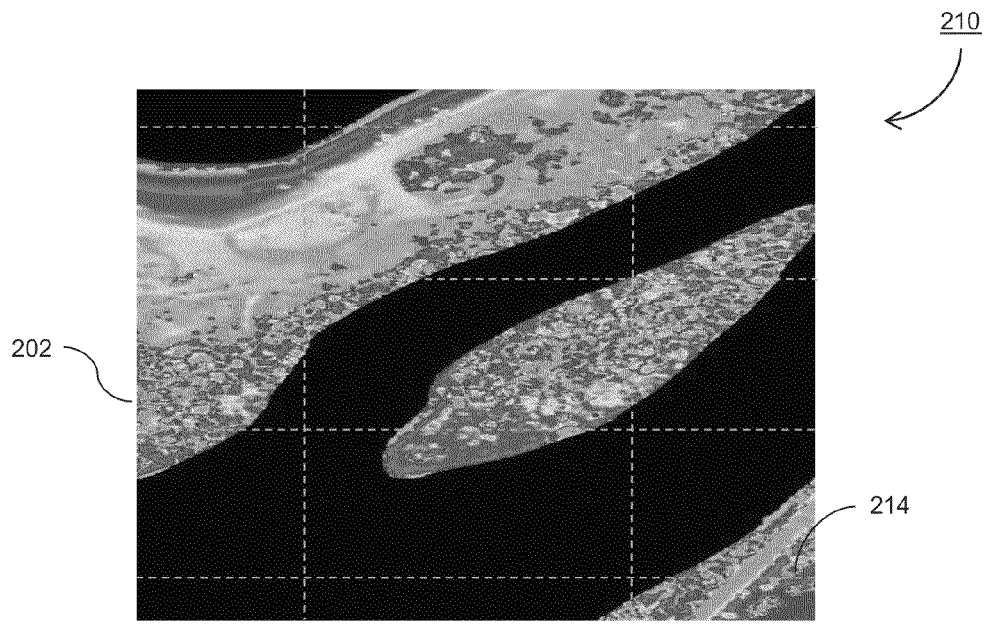

FIG. 2B illustrates a diagram 210 that includes color field 202 divided by a plurality of boundary lines 214. Boundary lines 214 are used to break color field 202 into a plurality of tiles. The position of boundary lines 214 may be determined such that the resulting tiles are processed in a desired amount of time by one or more processing servers.

Figure 2C:
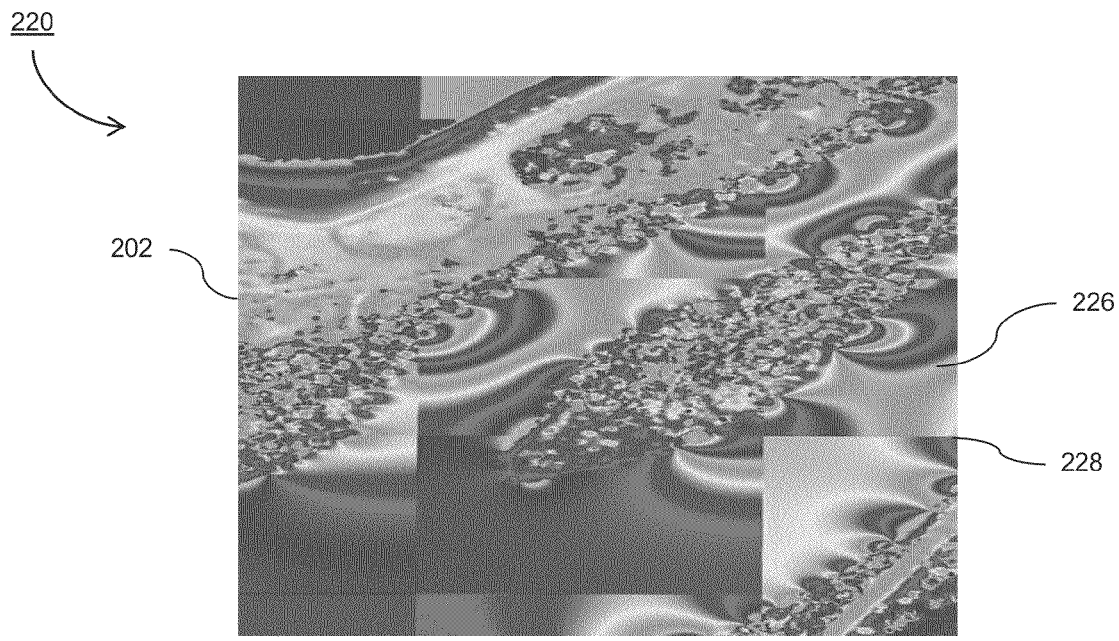

FIG. 2C illustrates a diagram 220 that includes a plurality of tiles where the holes are filled with fill data 226. Once color field 202 is divided into tiles by boundary lines 214, fill data 226 is generated to fill hole 204. Here, fill data 226 is represented in a tile various colors that fill the black areas of color field 202. Fill data 226 may be added to the data set or may be stored in a separate data structure. As a result of generating fill data 226 for hole 204, a discontinuity 228 may exist between the tiles along boundary lines 214. The discontinuity 228 appears in color field 202 as an abrupt change in color between the tiles along boundary lines 214.

Figure 2D:
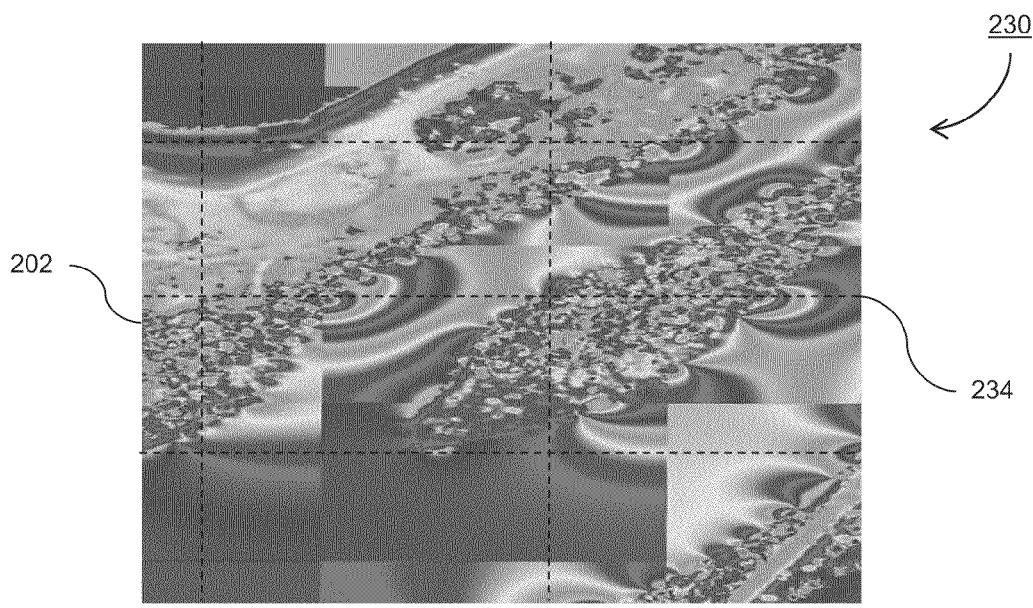

FIG. 2D illustrates a diagram 230 that includes color field 202 divided by a plurality of boundary lines 234 that are offset from boundary lines 214. Boundary lines 234 are used to break color field 202 into a plurality of tiles that differ from the plurality of tiles created by boundary lines 214. The position of boundary lines 234 may be determined by, for example, moving boundary lines 214 to a desired distance away from their original position.

Figure 2E:
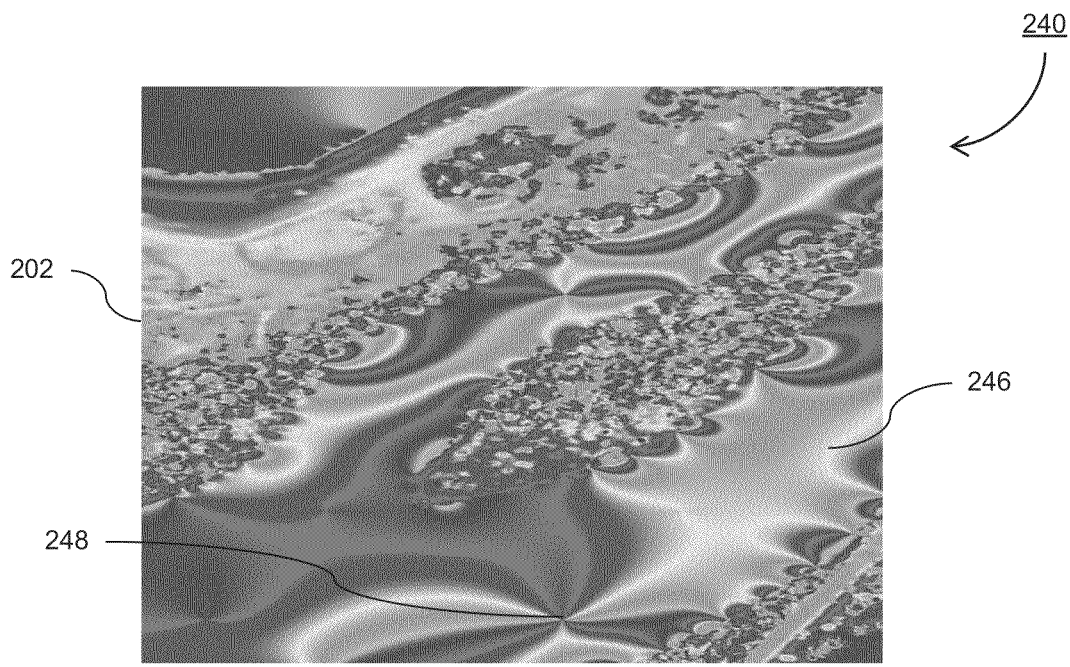

FIG. 2E illustrates a diagram 240 that includes a plurality of tiles where the holes are filled with fill data 246. Once color field 202 is divided into tiles by boundary lines 234, fill data 246 is generated to again fill hole 204. Fill data 246 includes the portion of fill data 226 that fall along boundary lines 234 in addition to new fill data that is generated based on the data values in the data set that surround hole 204. The portion of fill data 226 that is included in fill data 246 prevents a discontinuity in the fill data between boundary lines 234 as a result of generating fill data 246 separately for each tile. Fill data 246 may be added to the data set or may be stored in a separate data structure. As a result of generating fill data 246 for hole 204, a discontinuity 248 may exist between the tiles along boundary lines 234, especially where boundary lines 214 intersect boundary lines 234. The discontinuity 248 may appear in color field 202 as, for example, convergence point for the colors.

Figure 2F:
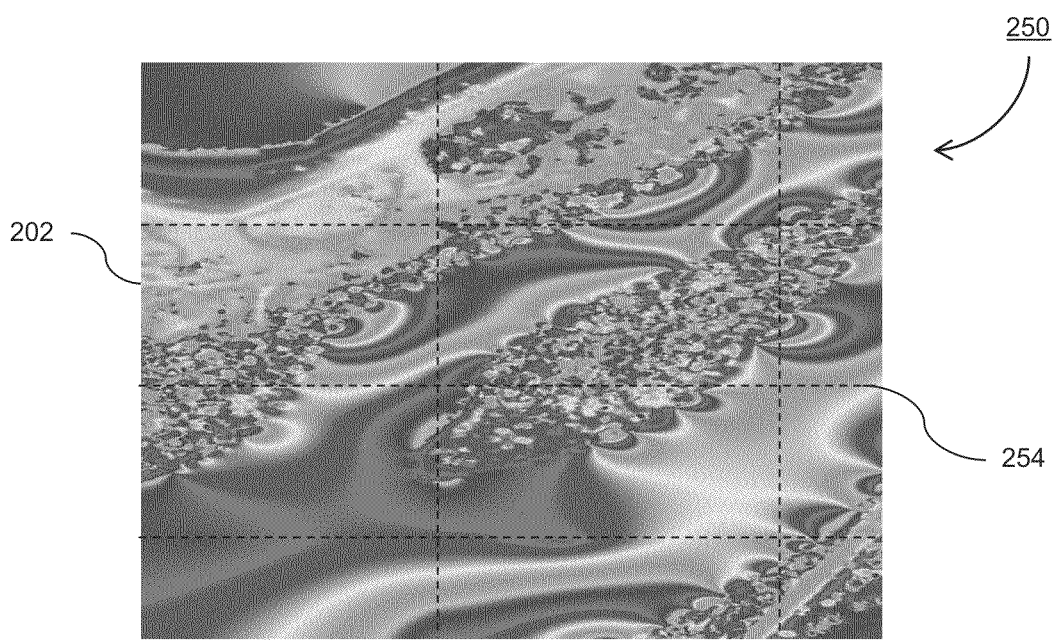

FIG. 2F illustrates a diagram 250 that includes color field 202 divided by a plurality of boundary lines 254 that are offset from both boundary lines 214 and 234. Boundary lines 254 are used to break color field 202 into a plurality of tiles that differ from the plurality of tiles created by both boundary lines 214 and 234. The position of boundary lines 254 may be determined by, for example, moving boundary lines 234 to a desired distance away from their original position.

Figure 2G:
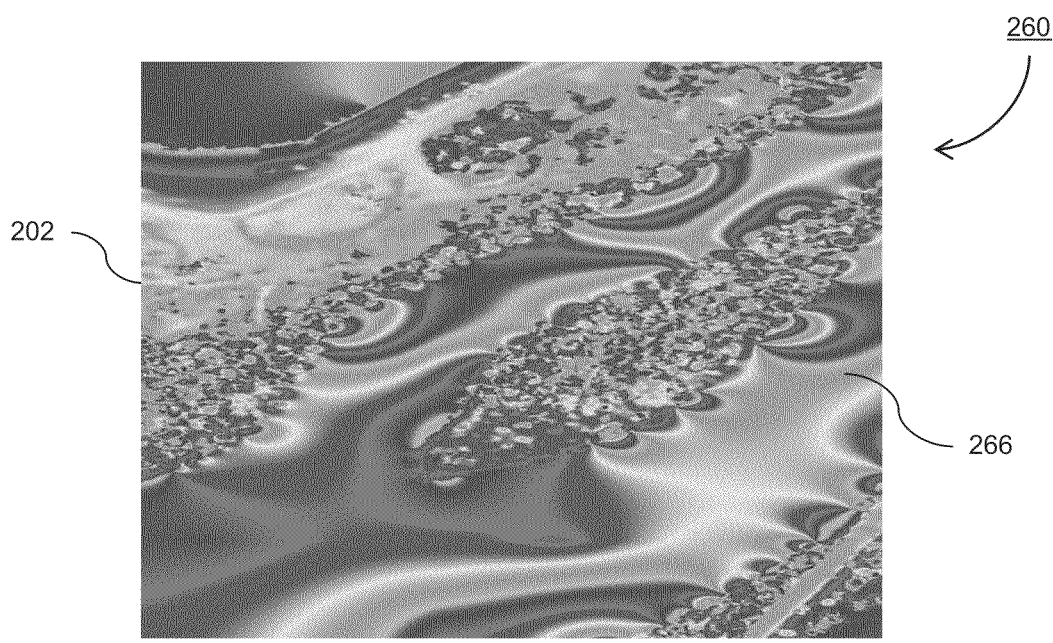

FIG. 2G illustrates a diagram 260 that includes a plurality of tiles where the holes are filled with fill data 266. Once color field 202 is divided into tiles by boundary lines 254, fill data 266 is generated to fill hole 204. Fill data 256 includes the portion of fill data 236 that fall along boundary lines 254 in addition to new data generated based on the data values in the data set that surround hole 204. The portion of fill data 246 that is included in fill data 266 prevents a discontinuity in fill data 266 between boundary lines 254 as a result of generating fill data 266 separately for each tile. Fill data 266 may be added to the data set or may be stored in a separate data structure. As a result of generating fill data 266 for hole 204, any discontinuity in the fill data will either be minimized or completely eliminated.

FIGS. 1A-G and 2A-G are provided as examples and are not intended to limit the embodiments described herein.

Example System Embodiments

Figure 3:
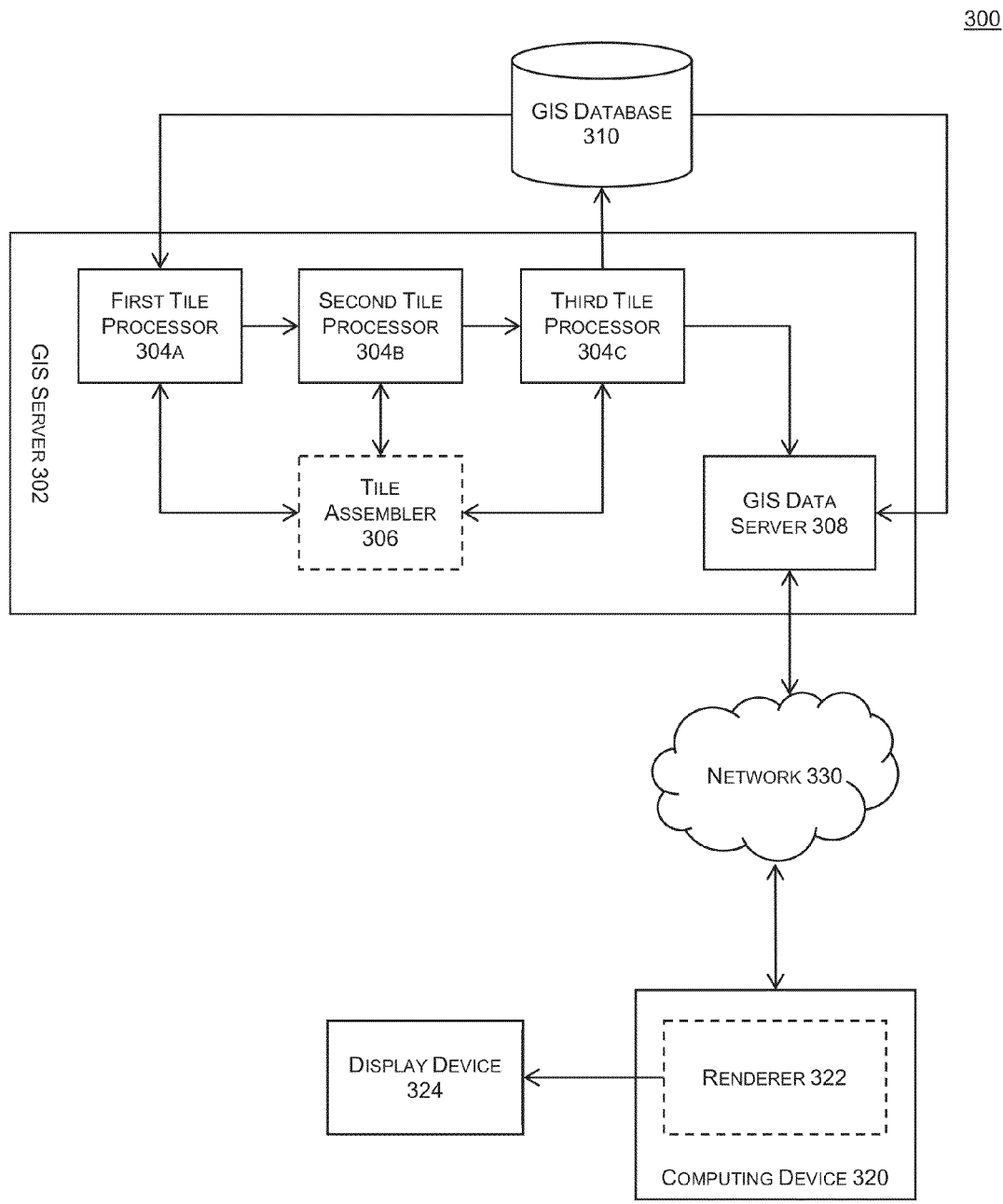
FIG. 3 illustrates an example system that may be used to fill missing data in a two-dimensional, spatially distributed data set according to an embodiment.

FIG. 3 illustrates an example system 300 that may be used to fill missing data in a spatially distributed, graphically represented data set, according to an embodiment. System 300 includes GIS server 302 that may provide geo-referenced or other spatially distributed data sets to computing device 320 via network 330. Computing device 320 includes renderer 322 that renders data sets and provides the rendering a user at display device 324.

Computing device 320 may be implemented on any computing device capable of processing or displaying rendered, spatially distributed data. Computing device 320 may include, for example, a mobile computing device (e.g. a mobile phone, a smart phone, a personal digital assistant (PDA), a navigation device, a tablet, or other mobile computing devices). Computing device 320 may also include, but is not limited to, a central processing unit, an application-specific integrated circuit, a computer, workstation, a distributed computing system, a computer cluster, an embedded system, a stand-alone electronic device, a networked device, a rack server, a set-top box, or other type of computer system having at least one processor and memory. A computing process performed by a clustered computing environment or server farm may be carried out across multiple processors located at the same or different locations. Hardware can include, but is not limited to, a processor, memory, and a user interface display.

In some embodiments, renderer 322, optionally included in computing device 320, is configured to render a three-dimensional environment provided by geo-referenced data and display the rendered three-dimensional environment at display device 324. In other embodiments, renderer 322 is configured to render height fields or color fields at described in FIGS. 1 and 2. Renderer 322 may be implemented in software or may be implemented, at least in part, in hardware by, for example, computing device 320's video card. Display device 324 may be implemented using any display device or monitor that can display a video signal received from computing device 320. While display device 324 is shown in system 300 as a separate device, sonic embodiments may include display device 324 in computing device 320. Such embodiments may include, for example, laptop computers, tablet devices, and smart phones.

Network 330 may include any network or combination of networks that can carry data communication. These networks may include, for example, a local area network (LAN) or a wide area network (WAN), such as the Internet. LAN and WAN networks may include any combination of wired (e.g., Ethernet) or wireless (e.g., Wi-Fi, 3G, or 4G) network components.

A. GIS Server

GIS server 302 may include any geographic information system capable of serving geo-referenced data. The geo-referenced data may include, for example, maps, satellite images, information layers, three-dimensional globes, navigable paths, data arrays such as, for example, height fields or color fields, and any other type of geographic data. The geo-referenced data may be served through a server component such as, for example, GIS data server 308 using any number of communication protocols such as, for example, Hypertext Transfer Protocol ("HTTP"), Hypertext Transfer Protocol Secure ("HTTPS"), Web Map Service ("WMS"), Web Map Tile Service ("WMTS"), Web Feature Service ("WFS"), Web Coverage Service ("WCS"), Web Processing Service ("WPS"), or Web Catalog Service ("CWS"). The geo-referenced data may be retrieved from a geographic databases such as, for example, GIS database 310. The geographic database may be implemented using a file storage application executed on GIS server 202, a stand-alone database server, or a network of database servers.

GIS server 302 may be implemented using a single computer server system or a distributed network of computer server systems. Computer server systems may include computing devices with, for example, one or more central processing units, memory units, and/or application-specific integrated circuits. Examples of computer server systems may include a computer, a workstation, a distributed computing system, a computer cluster, an embedded system, a stand-alone electronic device, a networked device, a rack server, a set-top box, or another type of computer system having at least one processor and memory.

In embodiments where the data sets include three-dimensional environments, the geo-referenced data may describe a three-dimensional mesh or height field that represents the surface of the terrain of the three-dimensional environment. In the case of a mesh, the mesh may be constructed of primitives that are each defined by at least a location within the mesh and a height value at each location. The location of each primitive may be indicated by a set of three-dimensional coordinates (e.g., x/y/z or latitude/longitude/altitude). In some embodiments, the location of a primitive may be indicated by a single coordinate set or by a coordinate set for each of the primitive's vertices. Primitives that may be described by the mesh may include, for example, triangles, squares, or other polygons. In embodiments where the mesh is made up of triangles, each of the three vertices of a triangle may include a coordinate set that describes the location of the vertex within the mesh.

To fill missing data in the data set, GIS server 302 may retrieve the data set from GIS database 310 and utilize first tile processor 304a, second tile processor 304b, third tile processor 304c, and, optionally, tile assembler 306 to process the data set. In some embodiments, tile processors 304a-c may determine the tiles in the data set that have one or more groups of missing data and only process those tiles with missing data. First tile processor 304a, second tile processor 304b, and third tile processor 304c each process the data sets in a similar, but distinct manner. For example, each of tile processors 304a-c divides the data set into a plurality of tiles along a plurality of boundary lines. The boundary lines utilized by each tile processor 304a-c differ and may depend on the boundary lines utilized by the tile processor that previously processed the data set. For example, the boundary lines utilized by one tile processor may be offset from the boundary lines utilized by another tile processor such that the tiles processed by each tile processor are generally the same size. The boundary lines may be determined based on a desired maximum tile size by, for example, an administrator of GIS server 302 or automatically by GIS server 302. In embodiments where GIS server 302 automatically determines the boundary lines, GIS server 302 may utilize factors such as, for example, data transfer speeds between GIS server 302 and computing device 320 or GIS server 302's available bandwidth to process each of the resulting tiles. Thus, in some embodiments, the functionality of tile processor 304a-c may be achieved using a different configuration of modules or components based on similar functionality.

Additionally, while system 300 is configured to fill missing data in a data set or data array where the boundary lines break the data set into a two dimensional grid of tiles, system 300 may also be configured to process data sets where the boundary lines break the data sets into more or less than two dimensional grids. This may be achieved by including a tile processor equal to one plus the dimension of tiles needed to process the data set. For example, system 300, as described here, is configured to process data sets where the boundary lines break the data set in a two-dimensional grid of tiles. If the data set can be processed using a one-dimensional grid of tiles, only two tile processors may be required. Alternatively, if the data set is processed using a three-dimensional grid of tiles, four tile processors may be used.

Each of tile processor 304a-c may use any known hole-filling algorithm including, but not limited to, a a diffusion-based hole filling algorithm.

1. First Tile Processor

First tile processor 304a, is configured to divide the data set into a first plurality of tiles along a first plurality of boundary lines. As described above, the first plurality of boundary lines may be determined by an administrator or by GIS server 302. The first plurality of boundary lines may include horizontal lines (e.g., x-axis), vertical lines (e.g., y-axis), or both. The boundary lines define a plurality of tiles of the data set that are each approximately the same size. Tiles on the edges of the data set, however, may be smaller or larger. The position of the first plurality of boundary lines may be set such that a horizontal and a vertical boundary line align with one of the data set's edges. In some embodiments, once the boundary lines are applied to the data set, the data set may be divided along the boundary lines into individual data sets. Alternatively, the data set may be maintained as one data structure.

Once the boundary lines are determined for the data set, tile processor 304a is configured to fill missing data in each tile. The missing data in each tile may be filled by, for example, generating one or more data values for each position in the data set with missing data. The data values generated to fill each missing data element may be based on data values from the data set that surrounds the missing data. In some embodiments, tile processor 304a may utilize a plurality of tile processing server systems, where a subgroup of tiles are processed by each tile processing server system. Whether to utilize multiple, parallel tile processing server systems may be determined by tile processor 304a based on, for example, the number of tiles, the dimension of the tile grid, or the amount of missing data needing filled.

In cases where the data set is divided into multiple tiles, tile processor 304a may also be configured to reassemble the tiles into a single data set. The data set may be reassembled by placing the tiles at the location in the mesh from where they originated. Tile processor 304a may utilize tile assembler 306, described below, to complete reassembly.

Because the missing data in the data set is processed on a tile-by-tile basis, discontinuities may exist between the data values generated to fill missing data that fall along the edges of the tiles. These discontinuities may be represented as lines, breaks, or apparent mismatches between the tiles of the data set. These discontinuities will be repaired as the data set is processed by second tile processor 304b and third tile processor 304c.

2. Second Tile Processor

After first tile processor 304a fills the missing data in the data set, second tile processor 304b is configured to divide the data set into a second plurality of tiles along a second plurality of boundary lines that are offset from the first plurality of boundary lines. The distance of the offset from the first plurality of boundary lines may be, for example, about one-third of the size of a tile created by the first plurality of boundary lines. For example, the horizontal (e.g., x-axis) boundary lines of the first plurality of boundary lines may be offset by about one-third of the vertical size of a tile (e.g., y-axis size), and the vertical (e.g., y-axis) boundary lines of the first plurality of boundary lines may be offset by about one-third of the horizontal size of the tile (e.g., x-axis size).

The second plurality of boundary lines define a second plurality of tiles of the data set that are each approximately the same size. Tiles on the edges of the data set, however, may be smaller or larger. In some embodiments, once the second plurality of boundary lines are applied to the data set, the data set may be divided along the second plurality of boundary lines into individual data sets. Alternatively, the data set may be maintained as one data structure.

Once the second plurality of boundary lines are determined for the data set, tile processor 304b may utilize a portion of the data generated by tile processor 304a that is spatially located around the second plurality of boundary lines. The utilized portion may be included in, for example, a data structure that will be used to record data values generated by tile processor 304b to fill the missing data values in each of the second plurality of tiles of the data set. In this way, any discontinuities that may normally occur along the borders of the second plurality of tiles by generating data values separately for each tile will be minimized. Additionally, at least some of the discontinuities that may exist between the borders of the first plurality of tiles will be minimized as tile processor 304b generates data values to fill the missing data in each of the second plurality of tiles.

Tile processor 304b is also configured to fill the missing data in each of the second plurality of tiles. The missing data in each tile may the same or a portion of the same missing data filled by tile processor 304a—the difference being that the data generated by tile processor 304a along the second plurality of boundary lines is added to the data generated by tile processor 304b. The missing data in each of the second plurality of tiles may be filled by, for example, generating one or more data values for each missing data element. The data generated to fill each missing data element may be based on data values that surround the missing data elements. In some embodiments, tile processor 304b may utilize the same plurality of tile processing server systems utilized by tile processor 304a. Whether to utilize multiple, parallel tile processing server systems may be determined by tile processor 304b based on, for example, the number of tiles, the dimension of the tile grid, or the extent of missing data needing filled.

In cases where tile processor 304b divides the data set into individual tiles, tile processor 304b may also be configured to reassemble the tiles into a single data set. The data set may be reassembled by placing each of the second plurality of tiles at the location in the data set where each tile respectively originated. Tile processor 304b may utilize tile assembler 306, described below, to complete reassembly.

Because only the data generated by tile processor 304a that falls along the second plurality of boundary lines is included with the data generated by tile processor 304b, the discontinuities created by tile processor 304a will be fixed by tile processor 304b generating data along the previous discontinuity areas. Discontinuities in the generated data, however, may still exist where the first plurality of boundary lines intersect the second plurality of boundary lines. These discontinuities may be represented in the generated data as points or small groups of points that appear inconsistent with the surrounding data. When represented graphically, these discontinuities may appear as higher or lower elevations or a convergence point.

3. Third Tile Processor

After second tile processor 304b fills the missing data in the data set, third tile processor 304c is configured to divide the data set into a third plurality of tiles along a third plurality of boundary lines that are offset from the second plurality of boundary lines. The distance of the offset from the second plurality of boundary lines may be, for example, about one-third of the size of a tile created by the second plurality of boundary lines.

The third plurality of boundary lines define a third plurality of tiles of the data set that are each approximately the same size. Tiles on the edges of the data set, however, may be smaller or larger. In some embodiments, once the third plurality of boundary lines are applied to the data set, the data set may be separated into individual data sets. Alternatively, the data set may be maintained as one data structure.

Once the third plurality of boundary lines are determined for the data set, tile processor 304c may utilize a portion of the data generated by tile processors 304a-b that is spatially located around the second plurality of boundary lines. The utilized portion may be included in, for example, a data structure that will be used to record data values generated by tile processor 304c to fill the missing data values in each of the third plurality of tiles of the data set. In this way, any discontinuities that may normally occur along the borders of the third plurality of tiles by generating data values separately for each tile will be minimized. Additionally, at least some of the discontinuities that may exist around the borders of the first and second plurality of tiles will be minimized as tile processor 304c generates data values to fill the missing data in each of the third plurality of tiles.

Tile processor 304c is also configured to fill the missing data in each of the third plurality of tiles. The missing data in each tile may be the same missing data filled by tile processor 304a and tile processor 304b—the differences being that the data generated by tile processors 304a-b along the third plurality of boundary lines are includes with the data generated by tile processor 304c. The missing data in each of the third plurality of tiles may be filled by, for example, generating one or more data values for each missing data element. The data generated to fill each missing data element may be based on data values in the data set that surround missing data elements. In some embodiments, tile processor 304c may utilize the same plurality of tile processing server systems utilized by tile processors 304a-b. Whether to utilize multiple, parallel tile processing server systems may be determined by tile processor 304c based on, for example, the number of tiles, the dimension of the tile grid, or the extend of missing data needing filled.

In embodiments where tile processor 304c divides the data set into individual tiles, tile processor 304c may also be configured to reassemble the tiles into a single data set. The data set may be by placing each of the second plurality of tiles at the location in the data set from where each tile respectively originated. Tile processor 304c may utilize tile assembler 306, described below, to complete the reassembly.

Because the data generated by tile processor 304a and tile processor 304b that fall along the third plurality of boundary lines are included with the data generated by tile processor 304c, any discontinuities remaining after tile processor 304a and tile processor 304b process the data set will be fixed by tile processor 304c generating data along the discontinuity areas. Once tile processor 304c completes its data filling process, any discontinuities should be minimized or completed eliminated.

In some embodiments, the missing data in the data set may be filled as part of a process to respond to a request for geo-referenced. In these embodiments, once tile processor 304c completes its generating process, tile processor 304c may provide the data set to GIS data server 308 so that the data set may be included with the response. In other embodiments, the missing data in the data set may be filled independent of requests for geo-referenced data. In these embodiments, once tile processor 304c completes its data generating process, tile processor 304c may add the generated data to the data set and provide the data set to GIS database 310 so that the data set may be stored with the geo-referenced data.

4. Tile Assembler

In some embodiments, GIS server 302 includes tile assembler 306. Tile assembler 306 is configured to assemble the plurality of tiles resulting from any one of the first, second, or third plurality of boundary lines into a continuous data set. Tile assembler 306 may be utilized by any one of tile processors 304a-c to reassemble tiles after data is generated for the missing data elements in each tile. To reassemble the tiles into a continuous data set, tile assembler 306 positions each tile in its original location in the data set.

Various aspects of embodiments described herein can be implemented by software, firmware, hardware, or a combination thereof. The embodiments, or portions thereof, can also be implemented as computer-readable code. The embodiment in system 300 is not intended to be limiting in any way.

Example Method Embodiments

Figure 4:
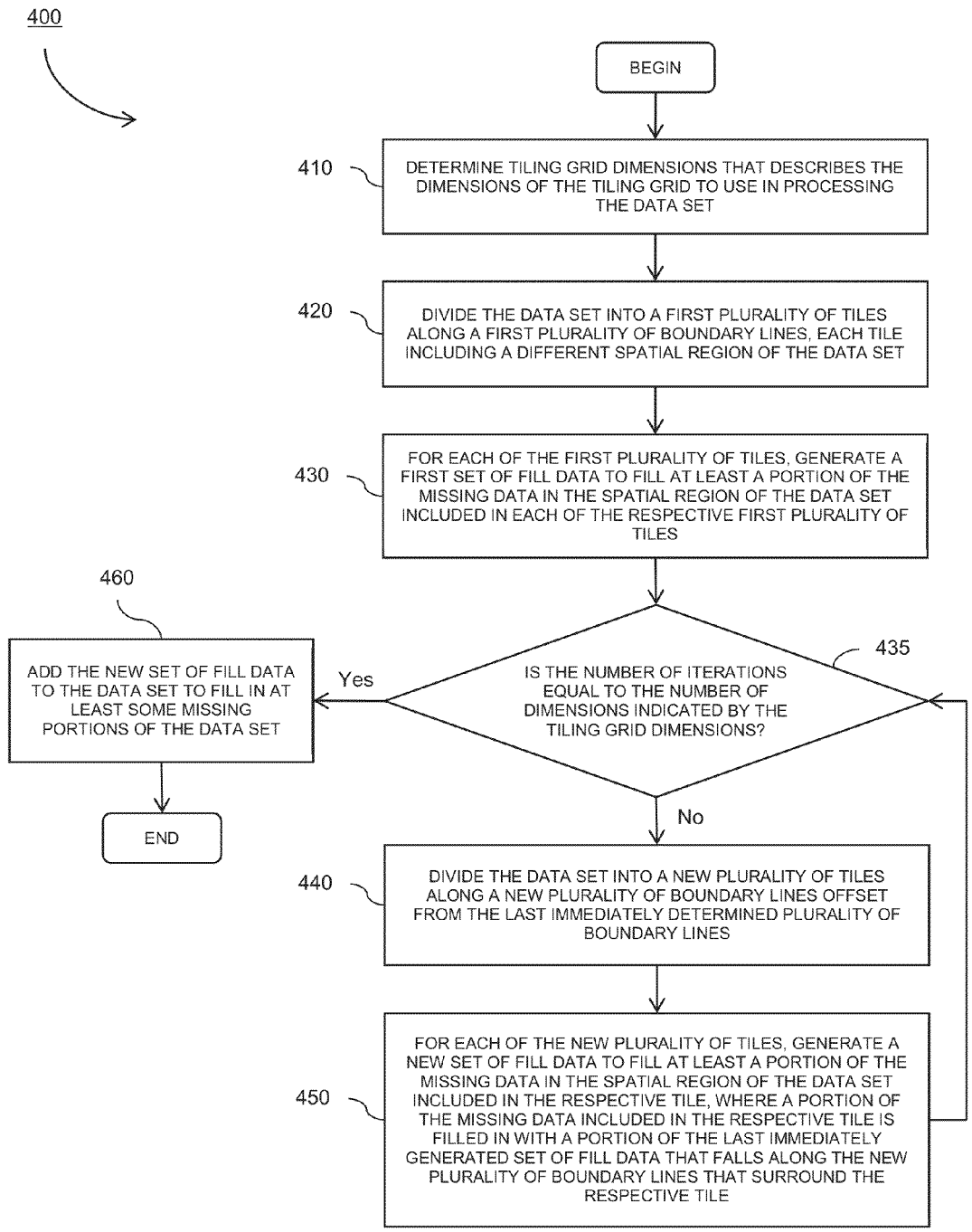
FIG. 4 is a flowchart illustrating an example method for filling missing data in a spatially distributed data set, according to an embodiment.

FIG. 4 is a flowchart illustrating an example method 400 for filling missing data in a spatially distributed, graphically represented data set, according to an embodiment. While method 400 is described with respect to an embodiment, method 400 is not meant to be limiting and may be used in other applications. Additionally, method 400 may be carried out by, for example, system 300 in FIG. 3.

Method 400 determines a tiling grid dimension that describes the number of dimensions of a tiling grid to use in processing the data set (stage 410). The dimension of the tiling grid may be based on factors such as, for example, the size of the data set, the processing power available to process the data set, the amount of time needed to process the data set, or the dimensions of the data set. Stage 410 may be carried out by, for example, first tile processor 304a in FIG. 3.

Method 400 then divides the data set into a first plurality of tiles along a first plurality of boundary lines (stage 420). Each tile includes a different spatial region of the data set and the number of tiles, the size of the tiles, and the dimensions of the tiles may be based on the determined tiling grid dimension. The tiles created by the first plurality of boundary lines may generally be the same size with variations of size occurring around the edges of the data set. Stage 420 may be carried out by, for example, first tile processor 304a in FIG. 3.

For each of the first plurality of tiles, method 400 then generates a first set of fill data to fill at least a portion of the missing data in the spatial region of the data set included in each of the respective first plurality of tiles (stage 430). Any data filling algorithm may be used to fill the missing data. Generally, algorithms that fill the missing data may utilize the data values from the data set that surround the missing data elements to calculate data values for the missing data elements. Stage 430 may be carried out by, for example, first tile processor 304a in FIG. 3.

Once the first set of fill data is generated, method 400 continues the following stages for a number of iterations that equal of the value of the determined tiling grid dimensions (stage 435). First, method 400 divides the data set into a new plurality of tiles along a new plurality of boundary lines offset from the last immediately determined plurality of boundary line (stage 440). The tiles created by the new plurality of boundary lines may generally be about the same size. The tiles may also encompass a different special region of the data set.

The last immediately determined plurality of boundary lines may be either the first plurality of boundary lines for the first iteration of this stage or the last plurality of boundary lines determined by this stage. The new plurality of boundary lines may be offset in each dimension by approximately one-third of the size of a tile created by the last immediately determined plurality of boundary lines. Thus, the tiles created by each new plurality of boundary lines may generally be the same size. Stage 440 may be carried out by, for example, second or third tile processors 304b-c in FIG. 3.

Second, for each of the new plurality of tiles, method 400 generates a new set of fill data to fill at least a portion of the missing data in the spatial region of the data set included in each respective tile (stage 450). Instead of being generated, however, a portion of the new set of fill data is provided by the portion of the last immediately generated set of fill data that falls along the new plurality of boundary lines that surround each respective tile. In this way, any discontinuities created by separately processing each tile will be reduced by each tile processing iteration. Stage 450 may be carried out by, for example, second or third tile processors 304b-c in FIG. 3.

Once the tile processing completes, the new set of fill data most recently generated may be added to the data set to form a data set, where any discontinuities between the fill data is minimized or completely eliminated (stage 460). Stage 460 may be carried out by, for example, tile assembler 306 in FIG. 3.

Example Computer System

Figure 5:
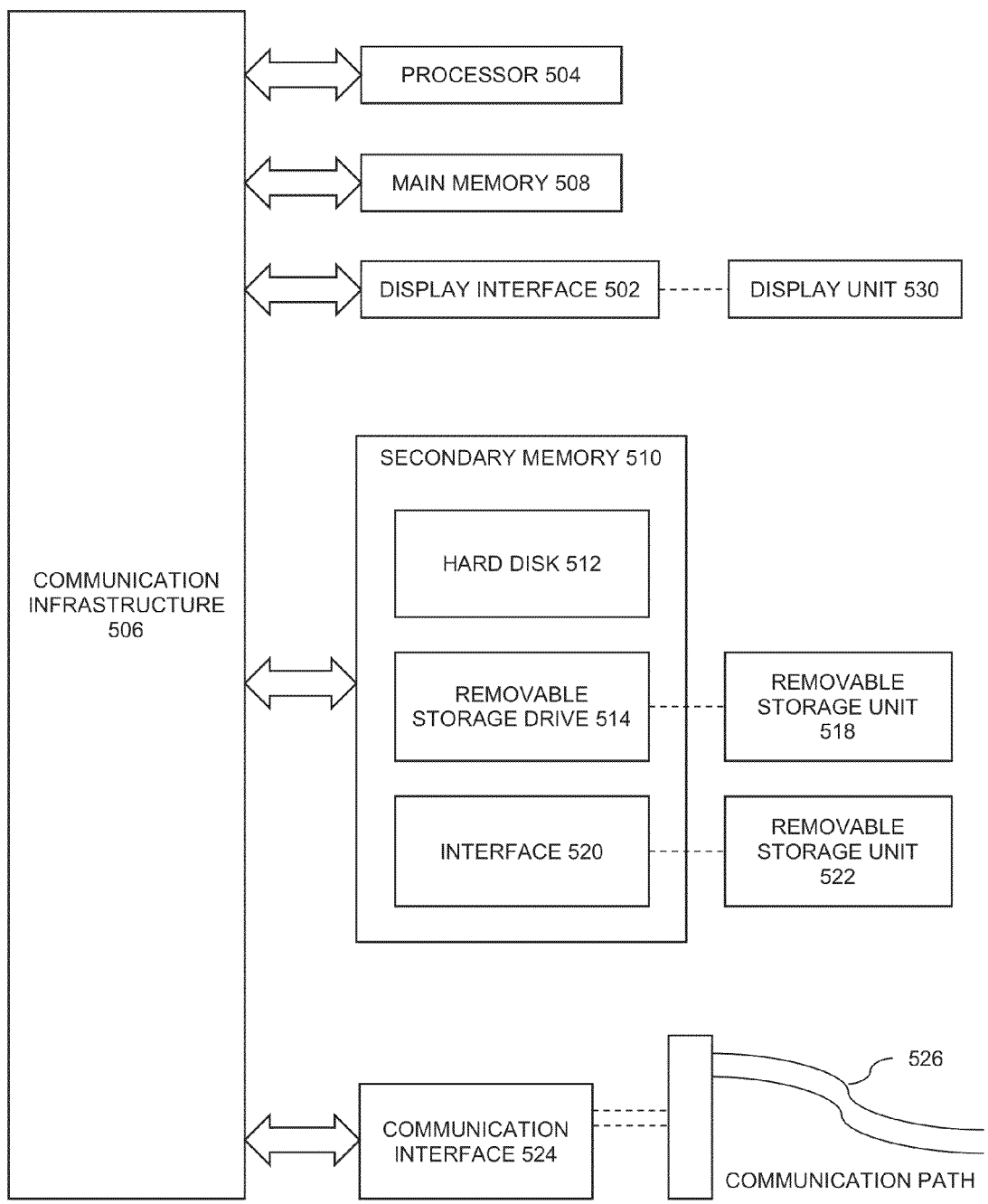
FIG. 5 illustrates an example computer in which the embodiments described herein, or portions thereof, may be implemented as computer-readable code.

FIG. 5 illustrates an example computer 500 in which the embodiments described herein, or portions thereof, may be implemented as computer-readable code. For example, first tile processor 304a, second tile processor 304b, third tile processor 304c, and tile assembler 306 may each be implemented in one or more computer systems 500 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme. Computer system 500 may also include display interface 502 and display unit 530.

Computer system 500 also includes a main memory 508, for example, random access memory (RAM), and may also include a secondary memory 510. Secondary memory 510 may include, for example, a hard disk drive 512, and removable storage drive 514. Removable storage drive 514 may include a floppy disk drive, a magnetic tape drive, an optical disk drive, a flash memory drive, or the like. The removable storage drive 514 reads from and/or writes to a removable storage unit 518 in a well-known manner. Removable storage unit 518 may include a floppy disk, magnetic tape, optical disk, flash memory drive, etc. which is read by and written to by removable storage drive 514. As will be appreciated by persons skilled in the relevant art, removable storage unit 518 includes a computer readable storage medium having stored thereon computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 518, removable storage unit 522, and a hard disk installed in hard disk drive 512. Computer storage medium and computer readable storage medium may also refer to memories, such as main memory 508 and secondary memory 510, which may be memory semiconductors (e.g. DRAMs, etc.).

Computer programs (also called computer control logic) are stored in main memory 408 and/or secondary memory 510. Computer programs may also be received via communications interface 524. Such computer programs, when executed, enable computer system 500 to implement the embodiments described herein. In particular, the computer programs, when executed, enable processor device 504 to implement the processes of the embodiments, such as, for example, the stages in the method illustrated by flowchart 400 of FIG. 4, described above. Accordingly, such computer programs represent controllers of computer system 500. Where an embodiment is implemented using software, the software may be stored in a computer storage medium and loaded into computer system 500 using removable storage drive 514, interface 520, and hard disk drive 512, or communications interface 524.

Embodiments of the invention also may be directed to computer program products including software stored on any computer readable storage medium. Such software, when executed in one or more data processing device, causes a data processing device(s) to operate as described herein.

Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for filling missing data in a spatially distributed, graphically represented data set, comprising:
    determining, by at least one computer processor, tiling grid dimensions that describes the dimensions of the tiling grid to use in processing the data set;
    dividing, by the at least one computer processor, the data set into a first plurality of tiles along a first plurality of boundary lines, each tile including a different spatial region of the data set, wherein the number of tiles, the size of the tiles, and the dimensions of the tiles are based on the tiling dimensions;
    for each of the first plurality of tiles, generating, by the at least one computer processor, a first set of fill data to fill at least a portion of the missing data in the spatial region of the data set included in each of the respective first plurality of tiles;
    for a number of iterations that equal the number of dimensions indicated by the tiling grid dimensions:
        dividing, by the at least one computer processor, the data set into a new plurality of tiles along a new plurality of boundary lines offset from the last immediately determined plurality of boundary lines, each tile comprising a different special region of the data set; and
        for each of the new plurality of tiles, generating, by the at least one computer processor, a new set of fill data to fill at least a portion of the missing data in the spatial region of the data set included in the respective tile, wherein a portion of the missing data included in the respective tile is filled in with a portion of the last immediately generated set of fill data that falls along the new plurality of boundary lines that surround the respective tile; and
    adding the new set of fill data to the data set to thereby fill in at least some missing portions of the data set.

2. The computer-implemented method of claim 1, wherein each element of the data set corresponds to a spatially located point.

3. The computer-implemented method of claim 2, where each element of the data set includes at least a color value.

4. The computer-implemented method of claim 2, wherein each element of the data set includes at least a height value that describes the height of the spatially located point that corresponds to the respective element.

5. The computer-implemented method of claim 2, wherein generating at least one set of fill data includes generating one or more data values for each element of the data set included in a group of missing data elements, each data value defining a height value that is based on height values from data values in the data set that surround the group of missing data elements.

6. The computer-implemented method of claim 2, further comprising:
prior to dividing the data set into a new plurality of tiles, adding only those data elements that fall along the new plurality of boundary lines from the last previously generated set of fill data to the new set of fill data.

7. The computer-implemented method of claim 1, wherein the data set defines a three-dimensional mesh that is made up of a plurality of primitives, each primitives defined by a location at each vertex.

8. The computer-implemented method of claim 7, wherein generating at least one of the sets of fill data includes determining a height value for one or more vertices of a primitive that converge at a single location in the mesh, the height value determined from height values associated with vertices of primitives in the mesh that surround the location.

9. The computer-implemented method of claim 7, wherein generating any one of the sets of fill data includes determining primitive data for each hole, the primitive data including a location value and a height value for one or more vertices.

10. The computer-implemented method of claim 1, further comprising:
prior to dividing the data set into a new plurality of tiles, discarding a portion of the last immediately generated set of fill data that does not correspond to an area around the new plurality of boundary lines.

11. A computer system for filling missing data in a spatially distributed, graphically represented, two-dimensional data set, the system comprising:
a first tile processor configured to:
divide the data set into a first plurality of tiles along a first plurality of boundary lines, each tile including a different spatial region of the data set;
for each of the first plurality of tiles, generate a first set of fill data to fill at least a portion of the missing data in the data set included in each of the respective first plurality of tiles;
a second tile processor configured to, after the first tile processor generates the first set of fill data:
divide the data set into a second plurality of tiles along a second plurality of boundary lines offset from the first plurality of boundary lines, each tile comprising a different spatial region of the data set;
for each of the second plurality of tiles, generate a second set of fill data to fill at least a portion of the missing data in the data set included in the second plurality of tiles, wherein the missing data included in the second plurality of tiles includes the missing data in the data set filled in with a portion of the first set of fill data that fall along the second plurality of boundary lines;
a third tile processor configured to, after the second tile processor generates the second set of fill data:
divide the data set into a third plurality of tiles along a third plurality of boundary lines offset from both the first and second plurality of boundary lines, each tile comprising a different spatial region of the data set;
for each of the third plurality of tiles, generate a third set of fill data to fill the missing data in the data set included in the third plurality of tiles, wherein the missing data included in the third plurality of tiles include the missing data in the data set filled in with a portion of the second set of fill data that fall along the third plurality of boundary lines, and wherein the third set of fill data, when added to the data set, fills in at least some missing portions of the data set;
a memory unit configured to store at least one of the first, second, or third tile processors;
and
a computer processor configured to execute at least one of the first, second, or third tile processors.

12. The computer system of claim 11, wherein the data set defines a three dimensional mesh, and wherein the three-dimensional mesh is made up a plurality of primitives, each primitive defined by a location at each vertex.

13. The computer system of claim 11, wherein the data set includes at least one data value at each element of the data set.

14. The computer system of claim 13, wherein at least one of the first, second, or third tile processors is further configured to generate one or more data values for each individual element of missing data in the data set, each data value including a height value that is based on height values from data value in the data set that surround missing data.

15. The computer system of claim 13, wherein the second tile processor is further configured to, prior to dividing the data set into the second plurality of tiles, add only those data values from the first set of fill data that fall along the second plurality of boundary lines to the second set of fill data.

16. The computer system of claim 13, wherein the third tile processor is further configured to, prior to dividing the data set into the third plurality of tiles, add only those data values from the second set of fill data that fall along the third plurality of boundary lines to the third set of fill data.

17. The computer system of claim 13, wherein the third tile processor is further configured to add the third set of fill data to the data set to form a complete data set.

18. The computer system of claim 13, wherein at least one of the second or third tile processors is further configured to, prior to dividing the data set into the plurality of tiles, discarding a portion of the last immediately generated fill data that does not correspond to an area around the plurality of boundary lines.

19. The computer system of claim 13, wherein the data value at each element of the data set includes at least a color data that describes a color to be displayed when the data set is rendered.

20. The computer system of claim 13, wherein the data value at each element of the data set includes at least height data that described the height of a position within the data set.

* * * * *